United States Patent [19]
Voelkerding et al.

[11] 3,765,703
[45] Oct. 16, 1973

[54] TRAILER HITCH GUIDING DEVICE
[76] Inventors: Frank J. Voelkerding, 230 S. Woodlawn St., Lake City, Iowa 51449; Maynard O. Voelkerding, 4850 Lone Hill Rd., Chattanooga, Tenn. 37416; John J. Voelkerding, 915 Trinidad St., Sp.C.48, Greeley, Colo. 80631

[22] Filed: Feb. 14, 1972
[21] Appl. No.: 226,174

[52] U.S. Cl............ 280/477, 33/264, 116/28, 280/475, 280/150.5
[51] Int. Cl............................. B60d 1/06
[58] Field of Search............. 280/477, 478 R, 500, 280/511; 33/264; 116/28

[56] References Cited
UNITED STATES PATENTS

| | | | |
|---|---|---|---|
| 2,409,399 | 10/1946 | Solon | 280/477 |
| 2,815,732 | 12/1957 | Majors | 116/28 |
| 3,084,953 | 4/1963 | McGregor | 280/477 X |
| 3,159,917 | 12/1964 | Whitehead | 280/477 X |
| 3,363,318 | 1/1968 | Folkins et al. | 280/264 |
| 3,420,549 | 1/1969 | Robinson | 280/477 |
| 3,482,847 | 12/1969 | Hart | 280/478 R X |
| 2,151,920 | 3/1939 | Jandus et al. | 280/501 |

FOREIGN PATENTS OR APPLICATIONS
934,358  8/1963  Great Britain .................. 280/477

OTHER PUBLICATIONS
Popular Science (Periodical), June 1970 – Page 95 only.

Primary Examiner—Leo Friaglia
Attorney—D. Paul Weaver et al.

[57] ABSTRACT

A method of coupling a towing vehicle to a towed vehicle utilizing a hitch having a hitch ball that is secured to the rear of the towing vehicle and a tongue having a socket that is secured to the front of the towed vehicle. The tongue is movable in a path transverse to its longitudinal center line. The backing up of the towing vehicle causes a guide member on the hitch to engage the tongue and move the tongue in the transverse path until the socket is above the hitch ball, after which the tongue is lowered to lower the socket onto the hitch ball. A hitch assembly, usable in the method, includes the guide member located upwardly of the hitch ball and mounted to the hitch having a bight located forwardly of the hitch ball and legs that diverge rearwardly of the bight on opposite sides of the hitch ball. Sight rods having indicator balls mounted to their tops are mounted to the rear ends of the guide member legs, and the guide member is mounted to the hitch for heightwise adjustment.

6 Claims, 7 Drawing Figures

Patented Oct. 16, 1973

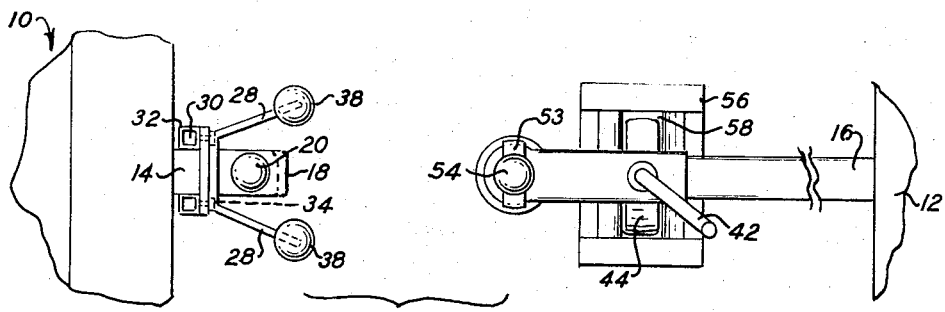
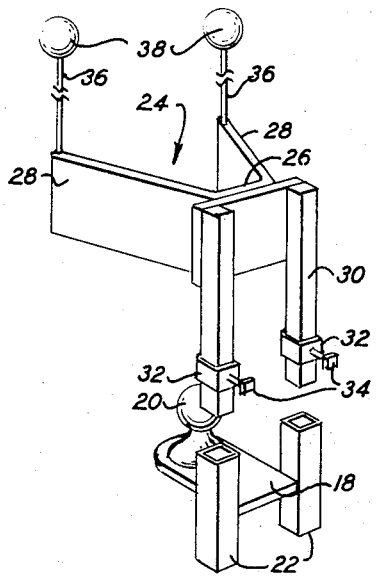
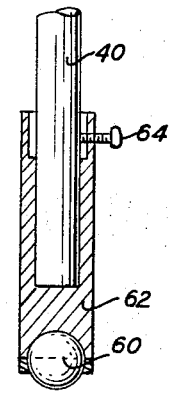
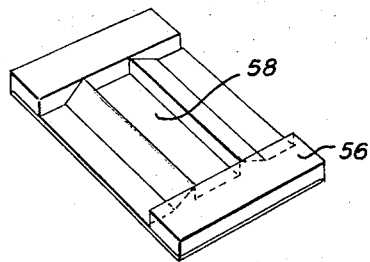
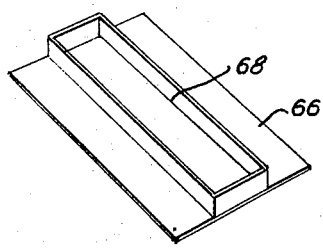

TRAILER HITCH GUIDING DEVICE

BACKGROUND OF THE INVENTION

In coupling a towing vehicle, such as an automobile, to a towed vehicle, such as a camper, it is commonplace to provide a hitch having a hitch ball on the rear of the towing vehicle and a tongue having a socket on the front of the towed vehicle. The towing vehicle is backed up so as to place the hitch ball beneath the socket, after which the tongue is lowered to place the socket on the hitch ball so as to couple the vehicles.

Difficulties arise, when backing up the towing vehicle, in ensuring that the hitch ball is beneath the socket. While the prior art, as indicated by U.S. Pats. Nos. 2,815,732; 3,084,953; 3,159,917; and 3,420,549, discloses arrangements for effecting proper alignment of the hitch ball and the socket, this is still a vexatious problem.

SUMMARY OF THE INVENTION

One aspect of this invention is concerned with a method of coupling the vehicles so as to ensure the placement of the socket over the hitch ball in response to the backing up of the towing vehicle. The tongue is supported for movement in a path transverse to its longitudinal center line and a guide member is provided on the hitch that has a bight located forwardly of the hitch ball and legs that diverge rearwardly of the bight on opposite sides of the hitch ball. The towing vehicle is placed in such a position that the hitch and the tongue face each other with the hitch ball and the tongue in approximate registry and with the guide member and the tongue in intersecting relationship. The towing vehicle is then backed up so that the tongue is initially engaged by the guide member between the rearwardmost extremities of the guide member legs and then seats itself against the bight in a position wherein the socket is above the hitch ball, the tongue moving in its transverse path between the times of initial engagement of the tongue with the guide member and the seating of the tongue against the guide member bight. After this, the tongue is lowered to lower the socket onto the hitch ball.

A second aspect of this invention is concerned with a hitch assembly which can be used in the method and which facilitates maintaining the tongue between the guide member legs when the towing vehicle is backed up. The hitch assembly includes the guide member mounted to the hitch and guide member indicators extending upwardly of the rear ends of the guide member legs. Thus, when the vehicle is backed up, the operator visually sights a tongue indicator extending upwardly of the tongue between the guide member indicators to ensure that the tongue will engage the guide member.

A third aspect of the invention is concerned with a construction of the hitch assembly that ensures that the guide member will be in intersecting relationship with the tongue when the towing vehicle is backed up regardless of the heightwise position of the tongue. This is achieved by mounting the guide member to the hitch for heightwise adjustment with respect to the hitch ball.

BRIEF DESCRIPTION OF THE DRAWING

FIG. 2 is a plan view taken on the line 2—2 of FIG. 1;

FIG. 4 is an isometric view of the hitch assembly;

FIG. 5 is an isometric view of a base plate having a track that supports and guides the tongue for movement in its transverse path;

FIG. 6 is a section of a modification of a follower member that is mounted to the tongue for enabling it to move in its transverse path; and FIG. 7 is an isometric view of a modification of a base plate and track for use with the follower member of FIG. 6.

DESCRIPTION OF THE PREFERRED EMBODIMENTS

Figure 1:
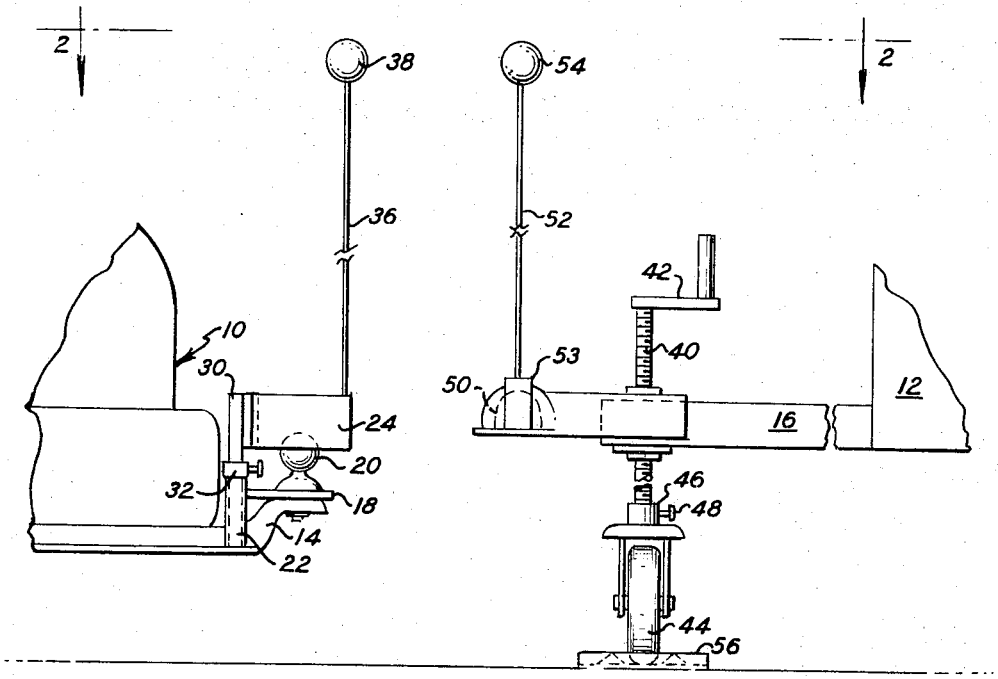
FIG. 1 is a side elevation of the towing and towed vehicles, together with the hitch assemblies and the tongue, before the towing vehicle is backed up.
Figure 3:
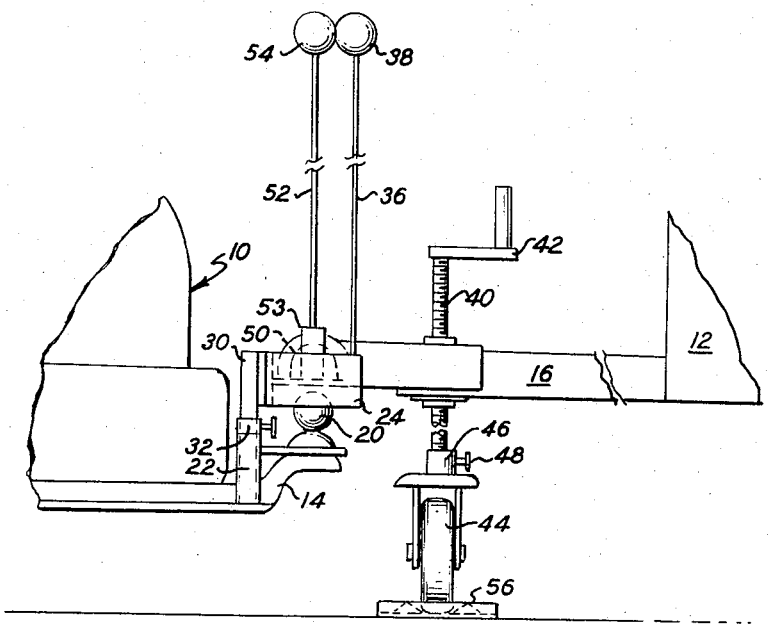
FIG. 3 is a view similar to FIG. 1 but showing the towing vehicle as having been backed up to the towed vehicle.

Reference number 10 (FIGS. 1-3) designates an automobile, which is the towing vehicle, and reference number 12 designates a camper, which is the towed vehicle. A hitch 14 is secured to the rear of the automobile in a conventional manner to extend rearwardly thereof and a tongue 16 is secured to the front of the camper in a conventional manner to extend forwardly thereof.

The hitch 14 includes a plate 18 to which a hitch ball 20 is anchored so as to extend upwardly thereof. As shown particularly in FIG. 4, a pair of vertically extending parallel sleeves 22 are secured, as by welding, to the plate 18 on opposite sides of the longitudinal center line of the hitch 14 and forwardly of the ball 20.

A guide member 24, having a bight 26 and a pair of legs 28 diverging rearwardly of the bight, is secured, as by welding, to a pair of shafts 30 that are insertable into the sleeves 22. A collar 32 is adjustably mounted on each shaft 30 by a bolt 34. When the shafts 30 are inserted into the sleeves 22, to thereby mount the guide member 24 to the hitch 14, the collars 32 bear against the tops of the sleeves 22 to limit the extent that the shafts move into the sleeves to thereby adjust the heightwie position of the guide member 24. When the guide member 24 is mounted to the hitch 14, it is located upwardly of the hitch ball 20 with the bight 26 located forwardly of the hitch ball and the legs 28 diverging rearwardly on opposite sides of the hitch ball. A sight rod 36 is insertable into a hole located at the rear end of each guide member leg 24 so as to extend upwardly thereof. An indicator, in the form of a ball 38, is mounted to the top of each sight rod 36.

As is conventional, a jack shaft 40 is threaded to the tongue 16 so as to extend therethrough on a heightwise axis and may be lowered and raised with respect to the tongue by means of a crank 42 that is secured to the top of the shaft 40. A dolly wheel 44 is rotatably mounted on a sleeve 46, and the sleeve 46 can be secured to the bottom of the jack shaft 40 by a bolt 48. The front of the tongue 16 has a socket 50 formed therein, the tongue being forward of the jack shaft 40. The socket is so dimensioned as to be seatable on the ball 20 when the automobile and camper are coupled to each other in the manner described below.

In accordance with this invention, a sight rod 52 is mounted to a clip 53 and the clip 53 is securable to the top of the front end of the tongue 16. The sight rod 52 thus extends upwardly of the tongue 16 along the longitudinal center line of the tongue. An indicator, in the form of a ball 54, is mounted to the top of the sight rod 52.

When the automobile 10 is towing the camper 12, the hitch 14 and the tongue 16 are coupled to each other with the hitch ball 20 located in the socket 50 and the socket locked against withdrawal from the hitch ball by the conventional safety catch on the tongue (not shown). Also, at this time, the jack shaft 40 is in an elevated position in the tongue 16 and the dolly wheel 46 is dismantled from the jack shaft 40.

FIG. 5 shows a base plate 56 having a track 58 which is adapted to receive the dolly wheel 44 and guide the dolly wheel for linear movement. When the automobile 10 and the camper 12 are in a location wherein it is desired to uncouple the automobile from the camper, the base plate 56 is placed on the ground beneath the jack shaft 40 so that the track 58 is transverse to the longitudinal center line of the camper 12 and the tongue 16. The dolly wheel 44 is then mounted to the bottom of the jack shaft 40 and the crank 42 is rotated so as to lower the dolly wheel 44 into the track 58. After releasing the safety catch, the crank 42 is further rotated to raise the tongue 16 so that the socket 50 moves upwardly of the hitch ball 20 thereby uncoupling the automobile 10 and the camper 12. The camper may then be leveled in the conventional manner and put to use.

When it is desired to couple the automobile 10 to the camper 12 so that the automobile may tow the camper, the guide member 24 is mounted to the hitch 14 by inserting the shafts 30 into the sleeves 22, the collars 32 having been so adjusted on the shafts 30 that the guide member is at the same elevation as the tongue 16 and in intersecting relationship therewith. The sight rods 36 are then inerted into the guide member legs 28 and the sight rod 52 is mounted to the tongue 16.

The automobile 10 is now moved in front of the camper 12 so that the hitch ball 20 and the socket 50 are in approximate registry and the automobile is backed up to bring the guide member 24 against the front of the tongue 16 with the tongue between the guide member legs 24. This operation is facilitated by the sight rods 36, 52 and the indicator balls 38, 54 as the operator can look through its rear view mirror while backing up and back up in such a manner as to visually ensure that the tongue indicator ball 54 is between the guide member indicator balls 38, thus ensuring that the front of the tongue 16 will engage the guide member 24 between the guide member legs 28. As the guide member engages the tongue, the tongue will shift transversely as it slides along one or the other of the guide member legs 28 until the tongue is seatd against the guide member bight 26, at which time the socket 50 is located above the hitch ball 20. The dolly wheel 44, acting as a follower member, moves in a transverse path to facilitate this transverse shifting of the tongue. Now the crank 42 is rotated in a direction so as to raise the jack shaft 40 with respect to the tongue 16 to thereby lower the socket 50 onto the hitch ball 20, after which continued rotation of the crank 42 in the same direction acts to raise the dolly wheel 44 upwardly of the track 58 so that the base plate 56 can be removed from the ground. The guide member 24 is now dismounted from the hitch 14 by lifting the shafts 30 so as to remove them from the sleeves 22, the sight rods 36 are removed from the guide member 24, the sight rod 52 is removed from the tongue 16, and the dolly wheel 44 is disconnected from the jack shaft 40. The safety catch is now casued to lock the tongue 16 to the hitch ball 20 and the automobile 10 is in condition to tow the camper 12.

FIG. 6 shows a ball 60 rotatably mounted in a sleeve 62 that can be secured to the bottom of the jack shaft 40 by a bolt 64. This assembly can, if desired, be used instead of the dolly wheel 44 and the sleeve 46. When the assembly of FIG. 6 is used, a base plate 66 (FIG. 7) having a track 68 so constructed as to guide the ball 60, is substituted for the base plate 56.

Instead of being of one peice as shown, the sight rods 36 and 52 may be made of telescoping sections.

We claim:

1. A hitch assembly, adapted to be secured to the rear of a towing vehicle and to be coupled to a socket of a tongue that is secured to the front of a towed vehicle to thereby couple the towing and towed vehicles, comprising: a hitch; a hitch ball on the hitch; a guide member located upwardly of the hitch ball having a bight located forwardly of the hitch ball and legs that diverge rearwardly of the bight on opposite sides of the hitch ball; and means mounting the guide member to the hitch for heightwise adjustment with respect to the hitch ball to thereby enable the guide member to be placed at an elevation that is in intersecting relationship with the tongue.

2. The hitch assembly of claim 1 wherein said means mounting the guide member to the hitch comprises: at least one heightwise extending sleeve secured to the hitch; a shaft secured to the guide member that is received in the sleeve; and a collar adjustably mounted to the shaft and bearing against the top of the sleeve.

3. The hitch assembly of claim 1 further comprising a guide member indicator secured to and extending upwardly from the rear end of each of said legs and a guide member indicator secured to and extending upwardly from said socket on said tongue to assist a driver in aligning said socket with said tongue.

4. The hitch assembly of claim 1 further comprising a follower member secured to and depending from said tongue and a track member on which said follower member rests, said track member being disposed transversely of said tongue to permit said tongue to move in a transverse path during coupling movement of said socket and said ball.

5. A hitch assembly, adapted to be secured to the rear of a towing vehicle and to be coupled to a socket of a tongue that is secured to the front of a towed vehicle to thereby couple the towing and towed vehicle comprising: a hitch; a hitch ball on the hitch; a guide member located upwardly of the hitch ball having a bight located forwardly of the hitch ball and legs that diverge rearwardly of the bight on opposite sides of the hitch ball; and means mounting the guide member to the hitch for heightwise adjustment with respect to the hitch ball; whereby the towing vehicle may be placed in such a position that the hitch and the tongue face each other with the hitch ball and the tongue in approximate registry and with the guide member and the tongue in intersecting relationship, the towing vehicle may then be backed up so that the tongue is initially engaged by the guide member between the rearwardmost extremities of said legs and then seats itself against said bight in a position wherein the socket is above the hitch ball with the tongue moving in a path transverse to its longitudinal center line between said initial engagement and said seating, and the tongue may then be lowered to lower the socket onto the hitch ball.

6. The hitch assembly of claim 5 wherein said means mounting the guide member to the hitch comprises: at least one heightwise extending sleeve secured to the hitch; a shaft secured to the guide member that is received in the sleeve; and a collar adjustably mounted to the shaft and bearing against the top of the sleeve.

* * * * *